United States Patent Office

2,879,166
Patented Mar. 24, 1959

2,879,166

MILK PRODUCT HAVING LOW SODIUM CONTENT AND PROCESS OF PRODUCING SAME

Donald F. Wilcox, Mill Valley, Calif., assignor to Foremost Dairies, Inc., San Francisco, Calif., a corporation of New York No Drawing. Application April 25, 1956
Serial No. 580,446

16 Claims. (Cl. 99—54)

This invention relates to a new and improved milk product of low sodium content, and to a novel process for producing such product.

Many attempts previously have been made to produce a satisfactory milk product of low sodium content. Such products are desirable for special dietetic purposes, particularly for patients suffering from kidney and liver disorders and certain heart ailments. It is desirable that such milk products have the sodium content thereof reduced to approximately one-tenth or less of the quantity of the sodium initially present in the natural milk from which it is prepared.

Milk of this type has frequently been referred to as "low sodium milk," and whereas the greatest possible removal of the sodium content thereof is desirable, such practice, in order to receive approval for medical use, must have at least approximately 90% of the total sodium content thereof removed.

The ideal for a so-called low sodium milk product is that of maintaining all of the characteristics, properties, and constituents of the original natural milk, with the sole exception of the sodium thereof which is removed. Products resulting from the processes of the prior art have not met this ideal, because in all instances the techniques employed for removing the sodium have also produced unwanted changes in other characteristics of the milk. Under the treatments of the prior art, these unwanted changes unavoidably have occurred as a result of the procedures employed for removing the sodium.

The difficulty of the problem involved in achieving the ideal is inherent in the chemical nature of natural milk. Milk includes in its composition salts of sodium, potassium, calcium, and magnesium, which exist in the form of citrates, phosphates, and chlorides. Furthermore, in natural milk, certain of these salts exist as complexes, the presence and characteristics of which bear directly upon the color and consistency of the milk, as well as the colloidal or dispersible characteristics of certain of the milk solids. As examples, reference is made to the colloidal protein-calcium-phosphate complexes and the colloidal salt complexes which are known to exist characteristically in natural milk.

As science has not yet achieved the synthesis of milk nor the synthesis of the complexes referred to, nor the ability to restore such complexes in milk if once they are destroyed, any process which successfully achieves the ideal referred to must avoid destruction or impairment of the essential aspects of such complexes, as well as the other essential characteristics of the milk composition. If the cation constituent of such complexes is once removed therefrom, the resulting product loses the true characteristics of milk as to color, consistency, and dispersibility, and the mere subsequent addition of the removed cations does not restore the properties of the milk nor produce a product possessing the color, consistency, and dispersibility of natural milk.

A further problem is involved if the flavor of the natural milk is to be preserved. For instance, if other salts, such as potassium, are substituted for the sodium, an undesirably high concentration of the potassium results which impairs or adversely affects the flavor of the product. Consequently, the ideal achievement also requires that the concentrations of the particular cations present in natural milk, other than sodium, not be materially increased above the values found in natural milk, nor, on the other hand, should the total salt content of the milk be materially raised.

It should be mentioned, however, that the sodium salts of milk apparently are sufficiently free from involvement in the complexes referred to as essential to the natural properties of milk, to be removable therefrom in quantities requisite for producing so-called low sodium milk, without materially affecting the natural properties of the resulting milk product.

The process of the present invention employs ion exchange resin techniques, and in practice it is capable of producing a so-called low sodium milk product which, except for the sodium salt, contains substantially all of the chemical constituents essential to the properties of the milk in substantially the form and quantity of each, respectively, as found in natural milk. In consequence, the product of this invention possesses the color and consistency characteristics of natural milk and the colloidal or dispersibility properties of the solids of natural milk.

In general, it has been found that processes of the prior art have failed to accomplish the objectives of this invention either because they involve major alterations in the proportions of cations normal to milk, or they are so rigorous as to seriously alter the naturally occurring colloidal salt complexes which are important to the maintenance of the color and stability of the milk. Generally, the concentrations of one or more of the natural cations are increased in amounts sufficient to replace the sodium ions removed, with the result that the natural flavor is seriously altered.

Accordingly, it is an object of this invention to produce a low sodium milk which retains the natural flavor and appearance of normal milk.

It is a further object of this invention to produce a so-called low sodium milk which possesses a substantially normal cation composition with respect to all cations other than sodium, and which also possesses the normal anions of milk in substantially their normal ratios, and in quantity reduced only in an amount equivalent to the reduction in cations. It is thus possible to maintain a calcium-phosphate ratio which is within the range acceptable for optimum nutritional utilization.

Another object is to produce a low sodium milk wherein the protein is in a stable form, so that the milk may be readily subjected to further processing, such as concentration, drying, sterilization, and the like.

It should be understood that the presence of magnesium in the finished product of this invention is far less important to the maintenance of the properties of natural milk than is the presence in normal concentrations of the original potassium and calcium. Accordingly, whereas a finished product more nearly resembling the constituency of normal milk, save for the removal of sodium, results when the magnesium content is preserved, this invention nevertheless embraces processes and products in which the magnesium content is not safeguarded or maintained, as well as processes and products in which the magnesium content is substantially preserved.

In accomplishing the objects of this invention, the sodium content of milk may be effectively reduced to a value below 50 mg. per liter, by treating the milk with a cation exchange resin consisting of the calcium, magnesium (if desired), potassium and ammonium forms of the resin in such proportions as to largely replace sodium ions with ammonium ions while retaining the calcium, magnesium (if desired), and potassium of milk in substantially their normal concentrations. Ammonium ions are removed from solution as ammonia by first treating the milk with a suitable anion exchange resin in the hydroxyl form, and thereafter subjecting the milk to known conditions which will cause ammonia to volatilize. This anion exchange resin treatment exchanges a portion of the citrate, phosphate, and chloride ions in the milk for hydroxyl ions. In certain instances, it may be desirable to preferentially retain completely one or more of the naturally occurring anions of milk, such as, for example, phosphate, in which case the anion exchange resin may be appropriately prepared in the hydroxyl and phosphate or other appropriate forms. In the case of phosphate, for instance, the concentration on the resin would be so adjusted as to prevent removal of phosphate from the milk while anions of milk other than phosphate are exchanged with the hydroxyl ions of the resin. In either case, the hydroxyl ions thus introduced into the milk combine with the ammonium ions forming ammonium hydroxide which is subsequently removed as ammonia with the formation of water, as, for instance, by heating the milk under vacuum. The net reaction, therefore, consists of replacing sodium salts with water. The anion exchange treatment may either precede or follow the cation exchange treatment.

Low sodium milk, wherein the sodium is replaced by potassium, as described by Chaney (U. S. Patent No. 2,707,152) possesses a bitter, unnatural flavor which seriously alters the natural milk flavor. This flavor defect is readily apparent in low sodium whole milk and is extremely pronounced in low sodium nonfat milk. The products of the present invention, however, have a substantially normal potassium content and thus are not subject to the above-described flavor defect. The superior flavor quality of products resulting from the present invention is, in large measure, attributable to the fact that sodium salts are replaced with water while all remaining cations are preserved in substantially their normal concentrations.

Processes involving removal of a substantial part of the calcium and other cations present in milk and their subsequent selective replacement in the form of salts or hydroxides completely fail to fulfill the objective of this invention. Such a process is described by Myers (U. S. Patent No. 2,511,825). Removal of a substantial part of the calcium present in milk causes irreversible changes to occur in the colloidal protein-calcium-phosphate complexes as well as colloidal salt complexes, thus destroying the natural color of the milk. Subsequent addition of calcium in such forms as calcium hydroxide does not restore these natural complexes of milk, hence products resulting from such processes are watery and translucent in appearance. Another defect inherent in processes involving removal of substantial amounts of the calcium present in milk is precipitation of protein with formation of serious amounts of sludge upon the subsequent addition of calcium hydroxide. This protein destabilization seriously limits any commercial application of the process or product. Yet another defect in low sodium milk produced by such processes is their lack of natural flavor. Flavor observed in these milks are bitter, chalky, and astringent. In contrast, the products produced by this invention possess normal flavor, appearance, and protein stability.

In carrying out the processes of this invention, it is preferred to use a cation exchange resin of high exchange capacity. As an example, it has been found that Chempro C-20, a sulfonic acid polystyrene resin manufactured by Chemical Process Company, is suitable. The resin, as received, is usually in the hydrogen form and may be converted to the desired composition of calcium, magnesium, potassium, and ammonium forms of the resin. This may be accomplished in one operation by passing a solution consisting of calcium, magnesium, potassium, and ammonium salts, such as chlorides, through the body of the resin held in a suitable column. The composition of this solution is adjusted so as to give the desired resin composition. Another means of securing the desired initial resin composition consists of separately converting one portion of the resin to the calcium form, a second portion to the magnesium form, a third portion to the potassium form, and a fourth portion to the ammonium form, and then mixing these various forms of the resin in such proportions as to secure the desired resin composition. For convenience, the resin composition will be expressed in terms of percentages of the total exchange capacity per unit volume of resin on an equivalent basis.

The milk to be treated is preferably in the nonfat form, although whole milk may be treated equally as well. The milk is brought into contact with the resin, generally by flowing the milk downflow through a column containing the resin. In this step, sodium ions of the milk are replaced by ammonium ions from the resin. The calcium, magnesium, and potassium forms of the resin are present in such quantity as to be in equilibrium with the exchangeable calcium, magnesium, and potassium in the milk. Thus, there is substantially no net change in the concentration of these ions in the milk. These reactions are illustrated by the following equation:

R·(CA++, Mg++, K+, NH$_4$+) +
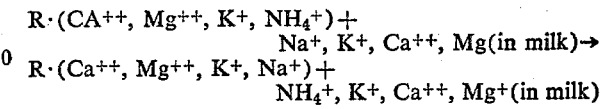
R·(Ca++, Mg++, K+, Na+) +
NH$_4$+, K+, Ca++, Mg+(in milk)

The exhausted resin, consisting of the calcium, magnesium, potassium and sodium forms of the resin, is regenerated to its starting composition. This may be readily accomplished by passing a solution of calcium, magnesium, potassium, and ammonium salts, such as chlorides, through the body of the resin. The composition of the regenerant salt solution is adjusted so as to produce the desired resin composition.

Ammonium ions in milk are productive of an extremely astringent flavor and so must be removed. This is accomplished by treating the milk with an anion exchange resin which may be entirely in the hydroxyl form or may consist of a mixture of hydroxyl and other forms such as citrate, phosphate, or chloride. For reasons of efficiency, it is preferable to use the resin entirely in the hydroxyl form. However, special applications may demand selective removal of one or more of the anions normal to milk. For example, if it were desired to remove only the chloride ion during the anion exchange step, an anion resin of hydroxyl, phosphate and citrate form would be used.

In one form of the present invention, the anion exchange resin is entirely in the hydroxyl form, hence the hydroxyl ions from the resin are exchanged for a portion of the citrate, phosphate, and chloride ions of the milk. The hydroxyl ions thus introduced into the milk combine with ammonium ions to form ammonium hydroxide. The milk is then heated under vacuum, distilling off ammonia and forming water. These reactions are illustrated by the following equations:

R'·(OH) + citrate, phosphate, chloride (in milk) →
R'·(citrate, phosphate, chloride) + OH⁻
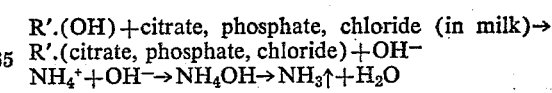

Thus, the overall reaction yields a product wherein the sodium salts of milk have been replaced with water, and wherein the calcium, magnesium, and potassium salts of milk have been retained in substantially their normal concentrations.

In practicing this invention, the anion exchange step may either precede or follow the cation exchange treatment. A suitable resin for this purpose may be a strongly basic type. As an example, Duolite A-41, manufactured by Chemical Process Company, is satisfactory. The amount of anion exchange resin to be used is calculated from the exchange capacity of the resin used and from the amount of ammonium ions introduced into the milk in the cation exchange treatment. A quantity of anion exchange resin should be used which is sufficient to provide hydroxyl ions stoichiometrically equivalent to or slightly in excess of the amount of ammonium ions introduced into the milk in the cation exchange treatment. This excess of hydroxyl ions causes the milk to have a pH value on the order of pH 7.0–7.5 after heating under vacuum to displace ammonia. The pH may be adjusted to a value normal to milk, usually pH 6.5–6.8 by addition of any suitable acid such as phosphoric acid, citric acid, hydrochloric acid, or lactic acid. It is preferred to use a mixture of acids, the mixture having the same relative proportions as the relative proportions of the anions removed by the anion exchange resin.

In carrying out the anion exchange treatment, it is important to insure that the pH does not exceed values of approximately pH 9.0–9.2. At values in excess of pH 9.0, the milk becomes translucent and the normal appearance of the milk is not completely restored upon subsequent lowering of the pH to a value normal to milk due to irreversible alteration of the colloidal-salt and protein-salt complexes. In the event that anion exchange treatment is productive of a pH value in excess of pH 9.0–9.2, it is desirable to conduct the anion exchange treatment in two steps, heating the milk under vacuum to displace ammonia after each anion exchange treatment. It is preferred to conduct the anion exchange treatment by a batch method wherein the required amount of resin is agitated within the entire lot of milk to be treated. Difficulties can arise in employing a column technique in that the first portion of milk through the column has a pH considerably in excess of pH 9.0 and thus the natural appearance of the milk may be altered.

Although the present invention is directed for the most part to the adjustment in concentration of only one cation of milk, notably sodium, it will be evident to those skilled in the art that the disclosures made herein may be readily utilized to effect standardization as to concentration of any cation of milk while maintaining in substantially normal concentrations the remaining cations of milk. In addition, it will be apparent that the anion content of milk may be adjusted over rather wide ranges through the use of procedures herein disclosed.

The detailed examples given below are for purposes of illustration only and are not intended to limit the invention. Other modifications of this invention will be apparent to those skilled in the art and are included within the scope of this invention.

Process No. 1

Milk is passed through a column containing a cation exchange resin of such composition as to largely replace sodium with ammonium ions while retaining the other cations in milk in substantially their normal concentrations. The milk is then treated with a quantity of anion exchange resin in the hydroxyl form, the quantity used being sufficient to provide hydroxyl ions equivalent to or slightly greater than the amount of ammonium ions introduced in the cation exchange step. The milk is separated from the resin and is then boiled under vacuum to remove ammonia. If necessary, the pH is adjusted to a value normal to milk using a dilute acid. Hydrochloric, citric, phosphoric or lactic acid may be used. It is preferred to use a mixture of hydrochloric, citric, and phosphoric acids in the same relative proportions as these anions are removed by the anion exchange resin.

*Example.*—7500 ml. skim milk was put through a column containing 1000 ml. of Chempro C–20 cation exchange resin, the resin consisting of 45% calcium, 5% magnesium, 30% potassium, and 20% ammonium forms of the resin. A 1000 ml. aliquot of the resulting low sodium milk was then treated with 40 ml. Duolite A–41 anion exchange resin in the hydroxyl form by a batch process. After 30 minutes, the resin was filtered off and the treated milk, pH 9.0, was boiled under a 29½ inch vacuum for 30 minutes. Distilled water was added to maintain constant volume. The resultant product, pH 7.25, was adjusted to pH 6.80 using a 0.25 N solution of an equimolar mixture of citric, phosphoric, and hydrochloric acids. Flavor and appearance of the final product were practically identical with those of the untreated milk.

|  | Sodium, m. eq./l. | Potassium, m. eq./l. | Calcium and Magnesium, m. eq./l. | Ammonium m. eq./l. |
|---|---|---|---|---|
| Control | 30.4 | 41.0 | 66.5 |  |
| Treated | 1.0 | 40.0 | 60.0 | 36.9 |

The spent cation resin from the above treatment may be then regenerated by passing five volumes of a salt solution containing 1.77% $CaCl_2.2H_2O$, 0.84% $MgCl_2.6H_2O$, 2.47% KCl, and 2.97% $NH_4Cl$ down flow through the resin. An aliquot of the regenerated resin was analyzed and the composition found to be 45.0% calcium, 5.8% magnesium, 27.5% potassium, 21.5% ammonium, and 0.2% sodium forms of the resin.

Process No. 2

Milk is treated with a quantity of strongly basic anion exchange resin in the hydroxyl form sufficient to provide hydroxyl ions equivalent to or slightly greater than the amount of ammonium ions subsequently introduced in the cation exchange step. The milk is separated from the resin and passed through a column containing a cation exchange resin of such composition as to largely replace sodium with ammonium ions, while retaining the other cations in milk in substantially their normal concentrations. The milk is then boiled under vacuum to remove ammonia. The pH of the resulting milk is then adjusted to a normal value using a dilute acid solution.

*Example.*—To 1750 ml. skim milk was added 70 ml. of Duolite A–41 anion exchange resin in the hydroxyl form. The milk and resin were agitated for 30 minutes and the resin then filtered off. The treated milk was then passed down flow through a column containing 125 ml. of Chempro C–20 cation resin, the resin consisting of 35% calcium, 3% magnesium, 42% potassium, and 20% ammonium forms of the resin. The milk was then boiled under a 29.5 inch vacuum for 30 minutes, with distilled water being added to maintain a constant volume. The resultant product pH 7.30 was adjusted to pH 6.80 using a 0.25 N solution of an equimolar mixture of citric, phosphoric, and hydrochloric acids.

|  | Sodium, m. eq./l. | Potassium, m. eq./l. | Calcium and Magnesium, m. eq./l. | Ammonium, m. eq./l. | Citrate, m. eq./l. | Phosphate, m. eq./l. | Chloride, m. eq./l. | Hydroxyl, m. eq./l. |
|---|---|---|---|---|---|---|---|---|
| Control | 25.6 | 42.2 | 68.0 |  | 29.9 | 91.7 | 38.2 |  |
| Treated | 1.4 | 38.3 | 63.6 | 32.5 | 20.9 | 78.4 | 27.0 | 33.5 |

Process No. 3

Milk is treated with a quantity of anion resin in the hydroxyl form sufficient to raise the pH to a value between 8.5 and 9.0. Resin is filtered off and milk put through a column containing a cation resin of such composition as to largely replace sodium ions with ammonium ions while retaining the other cations normal to milk in substantially their normal concentrations. The milk is boiled under vacuum to remove ammonia. The milk is then treated with an additional quantity of anion resin in the hydroxyl form, said quantity being sufficient, in conjunction with the quantity of anion resin used in the first treatment, to provide hydroxyl ions equivalent to or slightly greater than the amount of ammonium ions introduced in the cation exchange step. The milk is then boiled under vacuum to remove ammonia. The pH of the resulting low sodium milk is adjusted to a normal value using dilute acid.

*Example.*—To 25,000 ml. skim milk was added 700 ml. Duolite A-41 in the hydroxyl form. After 25 minutes the pH of the milk was 8.70. The anion resin was filtered off and the milk passed downflow through a column containing 2000 ml. Chempro C-20 cation resin, the resin consisting of 35% calcium, 3% magnesium, 42% potassium, and 20% ammonium forms of the resin. The effluent milk from the cation exchange column was then evaporated in a single-effect evaporator to approximately 18% total solids. This concentrate with a pH of 7.05 was then treated with 450 ml. Duolite A-41 in the hydroxyl form by a batch process. After 30 minutes the resin was filtered off and the light concentrate evaporated in a single-effect evaporator to approximately 40% total solids. The concentrate, pH 7.30, was then adjusted to pH 6.80 using a 0.25 N acid solution consisting of an equimolar mixture of citric, phosphoric, and hydrochloric acids. This concentrate was then spray-dried in a spray-drier. The resultant low sodium milk powder possessed a flavor and an appearance which were indistinguishable from normal milk powder.

| | Sodium, m eq./l. | Potassium, m. eq./l. | Calcium and Magnesium, m. eq./l. | Ammonium, m. eq./l. | Citrate, m. eq./l. | Phosphate, m. eq./l. | Chloride, m. eq./l. | Hydroxyl, m. eq./l. |
|---|---|---|---|---|---|---|---|---|
| Control | 23.9 | 44.1 | 70.0 | | 32.8 | 97.6 | 42.3 | |
| Treated | 1.7 | 39.0 | 65.2 | 32.1 | 20.9 | 88.7 | 29.9 | 33.2 |

This invention is not to be restricted to the specific examples herein given, as these are offered purely by way of illustration. Particularly, the invention is not to be restricted to any specific means for effecting contact between the milk and the ion exchange resins, as any known and satisfactory means will suffice. Furthermore, known means for effecting a removal of the ammonia and for adjusting the pH of the treated milk are contemplated as being within the scope of this invention.

What is claimed is:

1. The process of removing predetermined quantities of selected cations from milk while maintaining in predetermined concentrations other selected cations of milk, comprising, without reference to order, the steps of contacting milk with a body of synthetic cation exchange resin consisting of ammonium form of the resin and the form thereof of the cations selected to remain in the milk, said resin forms being present in proportions effective to replace with ammonium ions said predetermined quantities of the cations of the milk selected for removal while retaining said predetermined quantities of the cations of the milk selected to remain therein, contacting the milk with a quantity of anion exchange resin in the hydroxyl form, said quantity being sufficient to provide hydroxyl ions stoichiometrically substantially equivalent to the amount of ammonium ions present in said milk as a result of the cation exchange step, said ammonium ions and hydroxyl ions in the milk combining to form ammonium hydroxide which exists in chemical equilibrium with ammonia and water, and further comprising the steps of thereafter separating the milk from the last contacted ion exchange resin, and removing the ammonia therefrom by evaporation.

2. The process of claim 1, characterized in that the cation exchange step is conducted prior to the anion exchange step.

3. The process of claim 1, characterized in that the anion exchange step is conducted prior to the cation exchange step.

4. The process of producing milk of low sodium content having substantially normal flavor and appearance and having substantially the concentrations of calcium and potassium normally present in natural milk, comprising, without reference to order, the steps of contacting milk with a body of synthetic cation exchange resin consisting of calcium, potassium and ammonium forms of the resin in proportions effective to replace sodium ions with ammonium ions while retaining the other cations in the milk in substantially their original concentrations, contacting the milk with a quantity of anion exchange resin in the hydroxyl form, said quantity being sufficient to provide hydroxyl ions stoichiometrically substantially equivalent to the amount of ammonium ions present in the milk as a result of the cation exchange step, said ammonium ions and hydroxyl ions in the milk combining to form ammonium hydroxide which exists in chemical equilibrium with ammonia and water, and comprising the steps of thereafter separating the milk from the last contacted ion exchange resin, and removing the ammonia by evaporation.

5. The process of producing milk of low sodium content having substantially normal flavor and appearance and having substantially the concentrations of calcium, magnesium, and potassium normally present in natural milk, comprising, without reference to order, the steps of contacting milk with a body of synthetic cation exchange resin consisting of calcium, magnesium, potassium, and ammonium forms of the resin in proportions effective to replace sodium ions with ammonium ions while retaining the other cations in the milk in substantially their original concentrations, contacting the milk with a quantity of anion exchange resin in the hydroxyl form, said quantity being sufficient to provide hydroxyl ions stoichiometrically substantially equivalent to the amount of ammonium ions present in the milk as a result of the cation exchange step, said ammonium ions and hydroxyl ions in the milk combining to form ammonium hydroxide which exists in chemical equilibrium with ammonia and water, and comprising the steps of thereafter separating the milk from the last contacted ion exchange resin, and removing the ammonia by evaporation.

6. The process of claim 4, characterized in that the cation exchange step is conducted prior to the anion exchange step.

7. The process of claim 4, characterized in that the anion exchange step is conducted prior to the cation exchange step.

8. The process of claim 4, further characterized in that the pH of the resulting product is adjusted to the value normal to milk.

9. The process of claim 5, characterized in that the cation exchange step is conducted prior to the anion exchange step.

10. The process of claim 5, characterized in that the anion exchange step is conducted prior to the cation exchange step.

11. The process of claim 5, further characterized in that the pH of the resulting product is adjusted to the value normal to milk.

12. A process for producing a low sodium milk of essentially normal flavor and appearance and having substantially normal concentrations of calcium, magnesium, and potassium, comprising the steps of contacting the milk with a body of synthetic cation exchange resin, said resin consisting of the calcium, magnesium, potassium, and ammonium forms of the resin in such proportions as to replace sodium ions with ammonium ions while retaining the other cations in said milk in substantially their original concentrations, said proportions being approximately 45% calcium, 5% magnesium, 30% potassium, and 20% ammonium forms of said resin, separating the milk from said resin, contacting the milk with a quantity of strongly basic anion exchange resin in the hydroxyl form, said quantity being sufficient to provide hydroxyl ions stoichiometrically substantially equivalent to the amount of ammonium ions introduced into the milk during the cation exchange step, said ammonium ions and hydroxyl ions in the milk combining to form ammonium hydroxide which exists in chemical equilibrium with ammonia and water, separating the milk from said anion resin, removing ammonia by boiling under vacuum, and adjusting the pH to a value normal to milk using a dilute acid.

13. A process of producing a low sodium milk of essentially normal flavor and appearance and having substantially normal concentrations of calcium, magnesium, and potassium, comprising the steps of contacting the milk with a body of strongly basic anion exchange resin in the hydroxyl form, said quantity of anion resin being sufficient to provide hydroxyl ions stoichiometrically substantially equivalent to the amount of ammonium ions to be subsequently introduced in the cation exchange step, separating the milk from the anion exchange resin, contacting the milk with a body of synthetic cation exchange resin, said resin consisting of the calcium, magnesium, potassium and ammonium forms of the resin in such proportions as to replace sodium ions with ammonium ions while retaining the other cations in said milk in substantially their original concentrations, said proportions being approximately 35.0% calcium, 3.0% magnesium, 42.0% potassium, and 20.0% ammonium forms of said resin, said ammonium ions and hydroxyl ions in the milk combining to form ammonium hydroxide which exists in chemical equilibrium with ammonia and water, separating the milk from said cation exchange resin, removing ammonia by heating under vacuum, and adjusting the pH to a value normal to milk using a dilute acid.

14. A process for producing a low sodium milk of essentially normal flavor and appearance and having substantially normal concentrations of calcium, magnesium, and potassium, comprising the steps of contacting milk with a quantity of strongly basic anion exchange resin in the hydroxyl form, said quantity of anion resin being sufficient to raise the pH of said milk to a value between 8.5 and 9.0, separating said milk from said anion exchange resin, contacting said milk with a body of synthetic cation exchange resin, said cation exchange resin consisting of the calcium, magnesium, potassium, and ammonium forms of the resin in such proportions as to replace sodium ions with ammonium ions while retaining the other cations in said milk in substantially their original concentrations, said proportions being approximately 35% calcium, 3% magnesium, 42% potassium, and 20% ammonium forms of said resin, separating said milk from said cation exchange resin, removing ammonia from said milk by heating said milk under vacuum, contacting said milk with a quantity of strongly basic anion exchange resin in the hydroxyl form, said quantity of anion resin being sufficient, in conjunction with the quantity of anion resin used in the first step, to provide hydroxyl ions stoichiometrically substantially equivalent to the amount of ammonium ions introduced in the cation exchange step, said ammonium ions and hydroxyl ions in the milk combining to form ammonium hydroxide which exists in chemical equilibrium with ammonia and water, separating said milk from said anion exchange resin, removing ammonia by heating said milk under vacuum, and adjusting the pH of said milk to a value normal to milk using a dilute acid.

15. A low sodium milk of substantially the flavor, appearance and stability of natural milk, possessing calcium and potassium in substantially normal concentrations, and in which the total cation concentration of the original natural milk is reduced, said reduction in cation concentration being substantially equal to the quantity of removed sodium.

16. A low sodium milk of substantially the flavor, appearance and stability of natural milk, possessing calcium, potassium and magnesium in substantially normal concentrations, and in which the total cation concentration of the original natural milk is reduced, said reduction in cation concentration being substantially equal to the quantity of removed sodium.

References Cited in the file of this patent

UNITED STATES PATENTS

| | | |
|---|---|---|
| 2,511,825 | Myers | June 13, 1950 |
| 2,707,152 | Chaney et al. | Apr. 26, 1955 |